US006230295B1

(12) United States Patent
Watkins

(10) Patent No.: US 6,230,295 B1
(45) Date of Patent: *May 8, 2001

(54) BITSTREAM ASSEMBLER FOR COMPREHENSIVE VERIFICATION OF CIRCUITS, DEVICES, AND SYSTEMS

(75) Inventor: Daniel Watkins, Saratoga, CA (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/063,153

(22) Filed: Apr. 20, 1998

Related U.S. Application Data

(63) Continuation-in-part of application No. 08/838,798, filed on Apr. 10, 1997, now Pat. No. 5,983,022.

(51) Int. Cl.[7] ........................................ G01R 3/28
(52) U.S. Cl. ................................................ 714/742
(58) Field of Search ........................... 714/718, 44, 45, 714/46, 724, 742; 395/708; 707/101; 709/231

(56) References Cited

U.S. PATENT DOCUMENTS

| 5,659,539 | * | 8/1997 | Porter et al. | 709/231 |
| 5,737,495 | * | 4/1998 | Adams et al. | 707/104 |
| 5,768,527 | * | 6/1998 | Zhu et al. | 709/231 |
| 5,771,009 | * | 6/1998 | Nakaya | 341/50 |
| 5,787,253 | * | 7/1998 | McCreery et al. | 709/231 |
| 5,805,823 | * | 9/1998 | Seitz | 709/236 |
| 5,809,245 | | 9/1998 | Zenda . | |
| 5,856,984 | * | 1/1999 | Rushworth | 714/724 |
| 5,889,515 | | 3/1999 | McDade et al. . | |

OTHER PUBLICATIONS

Nasiopoulos, P.; Ward, R.K.; Otsuka, M., "The challenge of DVD authoring", Digital Signal Processing Proceedings, 1997. DSP 97., 1997 13th International COnference on, vol.: 1, 1997, pp. 311–314.*

Settle, T.F.; Ligang Lu, "Digital bit stream generator for testing MPEG video decoders", Consumer Electronics, IEEE Transactions on, vol.: 42 3, Aug. 1996, pp. 422–430.*

Rodriguez, A.A.; Fisher, M.; Markey, B., "Scripting languages emerge in standards bodies", IEEE Multimedia, vol.: 2 4, winter 1995, pp. 88–92.*

Seong Won Ryu; Chae Wook lim; Kyu Tae Park, "A hierarchial layered moedl for DVD authoring system", Consumer Electronics, IEEE Transactions on, vol.: 42 3, Aug. 1996, pp. 814–819.*

"L64020 Single–Chip DVD Decoder Scenario™ Family of DVD PC Reference" Copyright 1995–1998 by LSI Logic Corporation.

* cited by examiner

*Primary Examiner*—Albert Decady
*Assistant Examiner*—Guy Lamarre

(57) ABSTRACT

A system and method is provided for verifying the functionality of a multimedia device. In one embodiment, the system includes a device under test and a computer configured to test the device by providing test bitstreams and sequences of user actions to the device. The computer uses bitstream profiles to describe, edit, and generate multimedia bitstreams. The profiles are used to describe in human-intelligible form the values of fields of interest in multimedia bitstreams. Since the fields of interest vary between verification tests, the profile form is subject to change. Bitstream profiles for verification of the multimedia device software may comprise instruction mnemonics and associated operands which specify the navigation instructions in the test bitstreams. A compiler may be provided for converting the profile into bitstream field values, and a combiner may be provided for combining the bitstream field values with an existing bitstream to generate test bitstreams for verification. Additionally, a de-compiler may be provided for generating a bitstream profile from an existing bitstream. This profile could then be edited and compiled to generate a new test bitstream which has changed in the desired manner. Further, a test generation tool may be provided for automating this process to generate a set of test bitstreams which verifies all specified functionalities.

17 Claims, 10 Drawing Sheets

| Parameter Name | Range | Brief Description |
|---|---|---|
| ACH2_mix_ACH0 | 0 - 1 | mix mode for channel 2 to channel 0 |
| ACH2_mix_ACH1 | 0 - 1 | mix mode for channel 2 to channel 1 |
| ACH3_mix_ACH0 | 0 - 1 | mix mode for channel 3 to channel 0 |
| ACH3_mix_ACH1 | 0 - 1 | mix mode for channel 3 to channel 1 |
| ACH4_mix_ACH0 | 0 - 1 | mix mode for channel 4 to channel 0 |
| ACH4_mix_ACH1 | 0 - 1 | mix mode for channel 4 to channel 1 |
| AGLN_GPRMN | 128 - 143 | General Parameter Number for Angle Stream Number |
| ASTN_GPRMN | 128 - 143 | General Parameter Number for Audio Stream Number |
| CN | 1 - 255 | Cell Number |
| CommandNum | 1 - 255 | Command in corresponding Navigation Command Area |
| CompareOption | | one of the following relations: BC (Bit - wise compare), EQ (=), NE (<>), GE (>=), GT (>), LE (<=), LT (<) |
| CP1 | 0 - 15 | General Parameter Number for first parameter of a compare operation |
| CP2 | 0 - 15, 128 - 151 | General Parameter Number or System Parameter Number for second parameter of a compare operation |
| DomainId | | one of the following domains: FP_DOM (First Play), VMGM_DOM (Video Manager Menu), VTSM_DOM (Video Title Set Menu), VTSM_DOM_W_PGCN (Video Title Set Menu w/ Program Chain Number) |
| GPRMN | 0 - 15 | General Parameter Number |
| HL_BTNN | 0 - 36 | Highlighted Button Number |
| HL_BTNNI | 1 - 36 | immediate value specifying Highlight Button Number |
| ImmediateValue | -32769 to 32768 | immediate 16 bit value |
| InitialValueGPRMN | 0 - 15 | General Parameter Number containing initial value |
| MenuId | | one of the following menus: TITLE_MENU, ROOT_MENU, SP_MENU (Subpicture), AUD_MENU (Audio Stream), ANGL_MENU (Angle), PTT_MENU (Part of Title) |
| NV_TMR_VALUE | 0 - 0xFFFF | immediate value for Navigation Timer Register |
| ParentalLevel | 1 - 8 | Parental Management Level |
| PGCN | 0 - 0x7FFF | Program Chain Number |
| PGN | 1 - 99 | Program Number |
| PTTN | 1 - 999 | Part Of Title Number |
| Register_Mode | | one of the following modes: REGISTER_MODE, COUNTER_MODE |
| SDG | 0 - 15 | General Parameter Number for 1st parameter of Set |
| SET_AGLN | 128 - 143 | immediate value for Angle Stream Number |
| SET_ASTN | 128 - 143 | immediate value for Audio Stream Number |
| SET_SPSTN | 128 - 159, 191 192 - 223, 255 | immediate value for Subpicture Stream Number |
| SetCommand | | one of the following commands: MOV,SWP,ADD,SUB,MUL,DIV,MOD,RND,AND,OR,XOR |
| SPSTN_GPRMN | 128 - 143 | General Parameter Number for SPU Stream Number |
| SS | 0 - 15, 128 - 151 | General Parameter Number or System Parameter Number for 2nd parameter of Set |
| SubInstruction | | one of the following instruction qualifiers: NoLink, TopC, NextC, PrevC, TopPG, NextPG, PrevPG, TopPGC, NextPGC, PrevPGC, GoUpPGC, TailPGC, RSM |
| TT_PGCN | 0 - 0x7FFF | Program Chain Number |
| TTN | 1 - 99 | Title Number |
| VMGM_PGCN | 0 - 0x7FFF | Program Chain Number in Video Manager Menu |
| VTS_TTN | 1 - 99 | Title Number in Video Title Set |
| VTSN | 1 - 99 | Video Title Set Number |

FIG. 6

|    | Name | Parameters |
|----|------|------------|
| 1  | BREAK | |
| 2  | EXIT | |
| 3  | NOP | |
| 4  | CALLSS | VMGM_PGCN CN DomainId MenuId |
| 5  | GOTO | CommandNum |
| 6  | JUMPTT | TTN |
| 7  | JUMPVTS_TT | TTN |
| 8  | JUMPVTS_PTT | PTTN VTS_TTN |
| 9  | JUMPSS | VMGM_PGCN DomainId MenuId |
| 10 | JUMPSS_VTS | VTS_TTN VTSN DomainId MenuId |
| 11 | LINK | SubInstruction HL_BTNN |
| 12 | LINKPGCN | PGCN |
| 13 | LINKPTTN | PTTN HL_BTNN |
| 14 | LINKPGN | PGN HL_BTNN |
| 15 | LINKCN | CN HL_BTNN |
| 16 | SET | SetCommand SDG SS |
| 17 | SETI | SetCommand SDG ImmediateValue |
| 18 | SetAMXMD | GPRMN |
| 19 | SetAMXMDI | ACH4_mixing_ACH0 ACH3_mixing_ACH0 ACH2_mixing_ACH0 ACH4_mixing_ACH1 ACH3_mixing_ACH1 ACH2_mixing_ACH1 |
| 20 | SetGPRMMD | InitialValueGPRMN Register_Mode GPRMN |
| 21 | SetGPRMMDI | ImmediateValue Register_Mode GPRMN |
| 22 | SetHL_BTNN | GPRMN |
| 23 | SetHL_BTNNI | HL_BTNNI |
| 24 | SetNVTMR | GPRMN TT_PGCN |
| 25 | SetNVTMRI | NV_TMR_VALUE TT_PGCN |
| 26 | SetSTN | ASTN_GPRMN SPSTN_GPRMN AGLN_GPRMN |
| 27 | SetSTNI | SET_ASTN SET_SPSTN SET_AGLN |
| 28 | SetTmpPML | ParentalLevel CommandNum |
| 29 | CMPBREAK | CompareOption CP1 CP2 |
| 30 | CMPIBREAK | CompareOption CP1 ImmediateValue |
| 31 | CMPEXIT | CompareOption CP1 CP2 |
| 32 | CMPCALLSS | CompareOption CP1 CP2 VMGM_PGCN CN DomainId MenuId |
| 33 | CMPGOTO | CompareOption CP1 CP2 CommandNum |
| 34 | CMPIGOTO | CompareOption CP1 ImmediateValue CommandNum |
| 35 | CMPJUMPTT | CompareOption CP1 CP2 TTN |
| 36 | CMPJUMPVTS_TT | CompareOption CP1 CP2 TTN |
| 37 | CMPJUMPVTS_PTT | CompareOption CP1 CP2 PTTN VTS_TTN |
| 38 | CMPJUMPSS | CompareOption CP1 CP2 VMGM_PGCN DomainId MenuId |
| 39 | CMPJUMPSS_VTS | CompareOption CP1 CP2 VTS_TTN VTSN DomainId MenuId |
| 40 | CMPLINK | CompareOption CP1 CP2 SubInstruction HL_BTNN |
| 41 | CMPILINK | CompareOption CP1 ImmediateValue SubInstruction HL_BTNN |
| 42 | CMPLINKPGCN | CompareOption CP1 CP2 PGCN |
| 43 | CMPILINKPGCN | CompareOption CP1 ImmediateValue PGCN |
| 44 | CMPLINKPTTN | CompareOption CP1 CP2 HL_BTNN PTTN |
| 45 | CMPILINKPTTN | CompareOption CP1 ImmediateValue HL_BTNN PTTN |
| 46 | CMPLINKPGN | CompareOption CP1 CP2 HL_BTNN PGN |
| 47 | CMPILINKPGN | CompareOption CP1 ImmediateValue HL_BTNN PGN |
| 48 | CMPLINKCN | CompareOption CP1 CP2 HL_BTNN CN |
| 49 | CMPILINKCN | CompareOption CP1 ImmediateValue HL_BTNN CN |
| 50 | CMPSET | CompareOption CP1 CP2 SetCommand SDG SS |
| 51 | CMPISET | CompareOption CP1 CP2 SetCommand SDG SS |

FIG. 7A

|    | Name | Parameters |
|----|------|------------|
| 52 | CMPSETI | CompareOption CP1 CP2 SetCommand SDG ImmediateValue |
| 53 | CMPISETI | CompareOption CP1 CP2 SetCommand SDG ImmediateValue |
| 54 | CMPSetSTN | CompareOption CP1 CP2 ASTN_GPRMN SPSTN_GPRMN AGLN_GPRMN |
| 55 | CMPSetSTNI | CompareOption CP1 CP2 SET_ASTN SET_SPSTN SET_AGLN |
| 56 | CMPSetNVTMR | CompareOption CP1 CP2 GPRMN TT_PGCN |
| 57 | CMPSetNVTMRI | CompareOption CP1 CP2 NV_TMR_VALUE TT_PGCN |
| 58 | CMPSetGPRMMD | CompareOption CP1 CP2 InitialValueGPRMN Register_Mode GPRMN |
| 59 | CMPSetGPRMMDI | CompareOption CP1 CP2 ImmediateValue Register_Mode GPRMN |
| 60 | CMPSetAMXMD | CompareOption CP1 CP2 GPRMN |
| 61 | CMPSetAMXMDI | CompareOption CP1 CP2 ACH4_mixing_ACH0 ACH3_mixing_ACH0 ACH2_mixing_ACH0 ACH4_mixing_ACH1 ACH3_mixing_ACH1 ACH2_mixing_ACH1 |
| 62 | CMPSetHL_BTNN | CompareOption CP1 CP2 GPRMN |
| 63 | CMPSetHL_BTNNI | CompareOption CP1 CP2 HL_BTNNI |
| 64 | SET_LINK | SetCommand SDG SS SubInstruction HL_BTNN |
| 65 | SETI_LINK | SetCommand SDG ImmediateValue SubInstruction HL_BTNN |
| 66 | SetAMXMD_LINK | GPRMN SubInstruction HL_BTNN |
| 67 | SetAMXMDI_LINK | ACH4_mixing_ACH0 ACH3_mixing_ACH0 ACH2_mixing_ACH0 ACH4_mixing_ACH1 ACH3_mixing_ACH1 ACH2_mixing_ACH1 SubInstruction HL_BTNN |
| 68 | SetGPRMMD_LINK | InitialValueGPRMN Register_Mode GPRMN SubInstruction HL_BTNN |
| 69 | SetGPRMMDI_LINK | ImmediateValue Register_Mode GPRMN SubInstruction HL_BTNN |
| 70 | SetHL_BTNN_LINK | GPRMN SubInstruction HL_BTNN |
| 71 | SetHL_BTNNI_LINK | HL_BTNNI SubInstruction HL_BTNN |
| 72 | SetNVTMR_LINK | GPRMN TT_PGCN SubInstruction HL_BTNN |
| 73 | SetNVTMRI_LINK | NV_TMR_VALUE TT_PGCN SubInstruction HL_BTNN |
| 74 | SetSTN_LINK | ASTN_GPRMN SPSTN_GPRMN AGLN_GPRMN SubInstruction HL_BTNN |
| 75 | SetSTNI_LINK | SET_ASTN SET_SPSTN SET_AGLN SubInstruction HL_BTNN |
| 76 | SET_LINKPGCN | SetCommand SDG SS PGCN |
| 77 | SETI_LINKPGCN | SetCommand SDG ImmediateValue PGCN |
| 78 | SetAMXMD_LINKPGCN | GPRMN PGCN |
| 79 | SetAMXMDI_LINKPGCN | ACH4_mixing_ACH0 ACH3_mixing_ACH0 ACH2_mixing_ACH0 ACH4_mixing_ACH1 ACH3_mixing_ACH1 ACH2_mixing_ACH1 PGCN |
| 80 | SetGPRMMD_LINKPGCN | InitialValueGPRMN Register_Mode GPRMN PGCN |
| 81 | SetGPRMMDI_LINKPGCN | ImmediateValue Register_Mode GPRMN PGCN |
| 82 | SetHL_BTNN_LINKPGCN | GPRMN PGCN |
| 83 | SetHL_BTNNI_LINKPGCN | HL_BTNNI PGCN |
| 84 | SetNVTMR_LINKPGCN | GPRMN TT_PGCN PGCN |
| 85 | SetNVTMRI_LINKPGCN | NV_TMR_VALUE TT_PGCN PGCN |
| 86 | SetSTN_LINKPGCN | ASTN_GPRMN SPSTN_GPRMN AGLN_GPRMN PGCN |
| 87 | SetSTNI_LINKPGCN | SET_ASTN SET_SPSTN SET_AGLN PGCN |
| 88 | SET_LINKPTTN | SetCommand SDG SS HL_BTNN PTTN |
| 89 | SETI_LINKPTTN | SetCommand SDG ImmediateValue HL_BTNN PTTN |
| 90 | SetAMXMD_LINKPTTN | GPRMN HL_BTNN PTTN |
| 91 | SetAMXMDI_LINKPTTN | ACH4_mixing_ACH0 ACH3_mixing_ACH0 ACH2_mixing_ACH0 ACH4_mixing_ACH1 ACH3_mixing_ACH1 ACH2_mixing_ACH1 HL_BTNN PTTN |
| 92 | SetGPRMMD_LINKPTTN | InitialValueGPRMN Register_Mode GPRMN HL_BTNN PTTN |
| 93 | SetGPRMMDI_LINKPTTN | ImmediateValue Register_Mode GPRMN HL_BTNN PTTN |
| 94 | SetHL_BTNN_LINKPTTN | GPRMN HL_BTNN PTTN |
| 95 | SetHL_BTNNI_LINKPTTN | HL_BTNNI HL_BTNN PTTN |
| 96 | SetNVTMR_LINKPTTN | NV_TMR_VALUE TT_PGCN HL_BTNN PTTN |
| 97 | SetNVTMRI_LINKPTTN | GPRMN TT_PGCN HL_BTNN PTTN |

FIG. 7B

|     | Name | Parameters |
| --- | --- | --- |
| 98  | SetSTN_LINKPTTN | ASTN_GPRMN SPSTN_GPRMN AGLN_GPRMN HL_BTNN PTTN |
| 99  | SetSTNI_LINKPTTN | SET_ASTN SET_SPSTN SET_AGLN HL_BTNN PTTN |
| 100 | SET_LINKPGN | SetCommand SDG SS HL_BTNN PGN |
| 101 | SETI_LINKPGN | SetCommand SDG ImmediateValue HL_BTNN PGN |
| 102 | SetAMXMD_LINKPGN | GPRMN HL_BTNN PGN |
| 103 | SetAMXMDI_LINKPGN | ACH4_mixing_ACH0 ACH3_mixing_ACH0 ACH2_mixing_ACH0 ACH4_mixing_ACH1 ACH3_mixing_ACH1 ACH2_mixing_ACH1 HL_BTNN PGN |
| 104 | SetGPRMMD_LINKPGN | InitialValueGPRMN Register_Mode GPRMN HL_BTNN PGN |
| 105 | SetGPRMMDI_LINKPGN | ImmediateValue Register_Mode GPRMN HL_BTNN PGN |
| 106 | SetHL_BTNN_LINKPGN | GPRMN HL_BTNN PGN |
| 107 | SetHL_BTNNI_LINKPGN | HL_BTNNI HL_BTNN PGN |
| 108 | SetNVTMR_LINKPGN | GPRMN TT_PGCN HL_BTNN PGN |
| 109 | SetNVTMRI_LINKPGN | NV_TMR_VALUE TT_PGCN HL_BTNN PGN |
| 110 | SetSTN_LINKPGN | ASTN_GPRMN SPSTN_GPRMN AGLN_GPRMN HL_BTNN PGN |
| 111 | SetSTNI_LINKPGN | SET_ASTN SET_SPSTN SET_AGLN HL_BTNN PGN |
| 112 | SET_LINKCN | SetCommand SDG SS HL_BTNN CN |
| 113 | SETI_LINKCN | SetCommand SDG ImmediateValue HL_BTNN CN |
| 114 | SetAMXMD_LINKCN | GPRMN HL_BTNN CN |
| 115 | SetAMXMDI_LINKCN | ACH4_mixing_ACH0 ACH3_mixing_ACH0 ACH2_mixing_ACH0 ACH4_mixing_ACH1 ACH3_mixing_ACH1 ACH2_mixing_ACH1 HL_BTNN CN |
| 116 | SetGPRMMD_LINKCN | InitialValueGPRMN Register_Mode GPRMN HL_BTNN CN |
| 117 | SetGPRMMDI_LINKCN | ImmediateValue Register_Mode GPRMN HL_BTNN CN |
| 118 | SetHL_BTNN_LINKCN | GPRMN HL_BTNN CN |
| 119 | SetHL_BTNNI_LINKCN | HL_BTNNI HL_BTNN CN |
| 120 | SetNVTMR_LINKCN | GPRMN TT_PGCN HL_BTNN CN |
| 121 | SetNVTMRI_LINKCN | NV_TMR_VALUE TT_PGCN HL_BTNN CN |
| 122 | SetSTN_LINKCN | ASTN_GPRMN SPSTN_GPRMN AGLN_GPRMN HL_BTNN CN |
| 123 | SetSTNI_LINKCN | SET_ASTN SET_SPSTN SET_AGLN HL_BTNN CN |
| 124 | SET_CMP_LINK | SetCommand SCG SS CompareOption CP2 SubInstruction HL_BTNN |
| 125 | SETI_CMP_LINK | SetCommand SCG ImmediateValue CompareOption CP2 SubInstruction HL_BTNN |
| 126 | SET_CMPI_LINK | SetCommand SCG SS CompareOption CmpValue SubInstruction HL_BTNN |
| 127 | SETI_CMPI_LINK | SetCommand SCG ImmediateValue CompareOption CmpValue SubInstruction HL_BTNN |

FIG. 7C

```
1   INCLUDE "navic"
2   assemble 32
3   CMPIGOTO    EQ GPRM_6 0 Command16
4   SETI        MOV GPRM_4 1
5   CMPJUMPTT   GE GPRM_5 GPRM_0 GPRM_4 TTN_3
6   CMPJUMPTT   EQ GPRM_0 GPRM_4 TTN_2
7   SETI        MOV GPRM_4 2
8   CMPJUMPTT   EQ GPRM_0 GPRM_4 TTN_17
9   SETI        MOV GPRM_4 3
10  CMPJUMPTT   EQ GPRM_0 GPRM_4 TTN_18
11  SETI        MOV GPRM_4 1
12  CMPJUMPTT   EQ GPRM_3 GPRM_4 TTN_17
13  SETI        MOV GPRM_4 2
14  CMPJUMPTT   EQ GPRM_3 GPRM_4 TTN_2
15  SETI        MOV GPRM_4 3
16  CMPEXIT     EQ GPRM_9 GPRM_4
17  CMPJUMPSS_VTS GE GPRM_3 GPRM_4 TTN_1 VTSN_5 VTSM_DOM ROOT_MENU
18  SETI        MOV GPRM_7 0
19  SETI        MOV GPRM_6 0
20  SETI        MOV GPRM_5 0
21  SETI        MOV GPRM_4 0
22  SETI        MOV GPRM_3 0
23  SETI        MOV GPRM_2 0
24  SETI        MOV GPRM_1 0
25  SETI        MOV GPRM_0 0
26  SETI        MOV GPRM_9 3
27  SETI        MOV GPRM_8 0
28  end
29  FILE "code"
```

FIG. 8

BITSTREAM ASSEMBLER FOR COMPREHENSIVE VERIFICATION OF CIRCUITS, DEVICES, AND SYSTEMS

RELATED APPLICATIONS

This application is a continuation-in-part of U.S. patent application Ser. No. 08/838,798 now U.S. Pat. No. 5,983,022 filed Apr. 10, 1997 with the inventors Daniel Watkins, Shat Mar, and Sobha Varma.

BACKGROUND OF THE INVENTION

1. Field of the Invention

This invention relates to the field of testing bitstream devices, and in particular to a system for efficiently creating data streams which can be used for device testing.

2. Description of the Related Art

Electronic systems which perform data stream processing are being developed for many applications including video and audio compression such as MPEG, JPEG, and AC3, high-speed interconnection such as Fibre Channel and 1394, and digital communication such as wireless, Ethernet, V34 modems and ATM. By necessity, the development of systems for these applications includes testing and verification of system designs, and in particular, testing and verification of the system's implementation of the data stream syntax.

Data stream processing systems convert a stream of data to or from a structured sequence of data having a syntax. The syntax causes the portions of the data stream to assume meaning, i.e. the structured sequence cannot be treated as a stream of random data. Rather, the syntax is expected to be present, and structured data sequences must be used to test that data stream processing systems properly implement their functions.

A testing approach used in the past relies on a library of sample sequences which are constructed to test specific syntax rules, specific combinations of syntax rules, or performance on "typical" sequences. This approach has the drawback of requiring an enormous amount of storage space in order to provide a moderate amount of test coverage in today's increasingly sophisticated encoding and decoding algorithms. Furthermore, these libraries are difficult to produce and difficult to modify when syntax rules change. Also, simply combining libraries to test a device which incorporates multiple syntax sets does not provide adequate or efficient test coverage.

The importance of finding an efficient, user-friendly method of generating structured sequences cannot be overstated for testing compliance to standards such as DVD which provide for an extreme degree of flexibility. Functionality verification requires a wide variety of sequences be generated and applied to a device, and a way to manage and track the resulting overabundance of data streams is needed. For complete verification, it is often necessary to change a single bit in a single field in a two-hour (>2 GB!) data stream. Clearly an efficient method for specifying the content of data streams is needed.

In addition to compressed audio and video substreams, the DVD standard provides for a "navigation" substream which specifies ways in which a DVD system user can interact with the entertainment program. In many respects, the structure of the navigation substream resembles a software program for specifying a user interface. Verifying the functionality of a DVD system which implements the navigation substream requires the ability to efficiently generate a huge number of navigation substreams.

SUMMARY OF THE INVENTION

Accordingly, there is provided herein a system and method for verifying the functionality of a multimedia device. In one embodiment, the system includes a device under test and a computer configured to test the device by providing test bitstreams and sequences of user actions to the device. The computer uses bitstream profiles to describe, edit, and generate multimedia bitstreams. The profiles are part of a bitstream management system which includes tools for generating profiles from existing multimedia bitstreams and for generating multimedia bitstreams from profiles. The profiles are used to describe in human-intelligible form the values of various fields of interest in multimedia bitstreams. Since the fields of interest vary between verification tests, the profile form is subject to change.

Typically the multimedia device under test will comprise hardware for converting presentation data in the multimedia bitstream into audio and video signals, and software for implementing navigation functions related to the presentation material. The navigation functions may be specified in a navigation substream interleaved with other substreams in the multimedia bitstream. The navigation substream comprises many navigation instructions which may be flexibly placed to specify the desired navigation functions. Bitstream profiles for verification of the multimedia device software may comprise instruction mnemonics and associated operands which specify the navigation instructions in the test bitstreams. A profile compiler may be provided for converting the bitstream profile into bitstream field values, and a combiner may be provided for combining the bitstream field values with an existing bitstream to generate test bitstreams for verification. Additionally, a bitstream de-compiler may be provided for generating a bitstream profile from an existing bitstream. This profile could then be edited and compiled to generate a new test bitstream which has changed in the desired manner. A test generation tool may be provided for automating this process to generate a set of test bitstreams which verifies all specified functionalities.

BRIEF DESCRIPTION OF THE DRAWINGS

Other objects and advantages of the invention will become apparent upon reading the following detailed description and upon reference to the accompanying drawings in which:

FIG. 6 is a table of illustrative parameter names, ranges, and descriptions;

FIGS. 7A–7C is a table of illustrative instruction mnemonics and their required parameters; and FIG. 8 is an exemplary profile.

Figure 1:
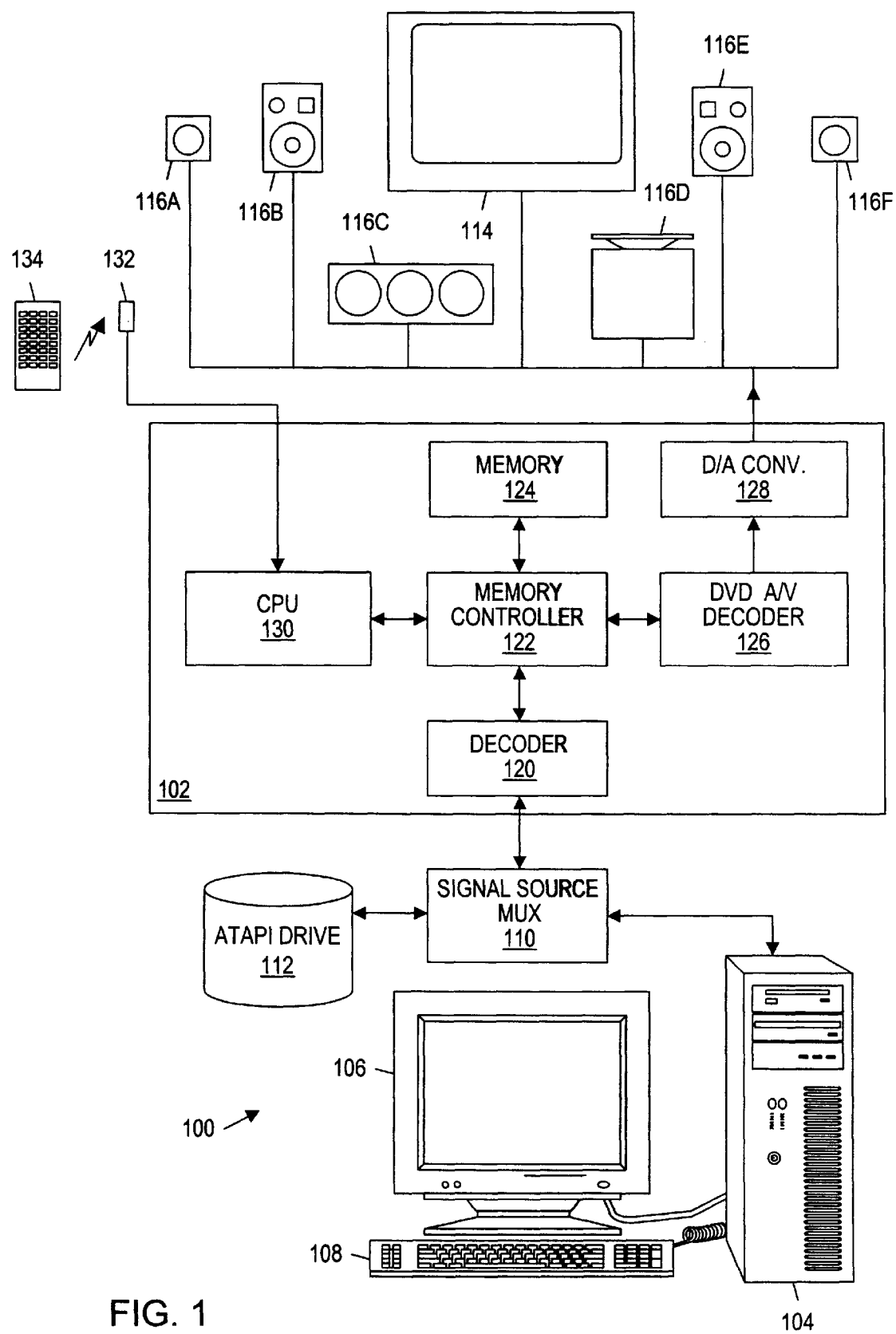
FIG. 1 is a block diagram of a system for testing a multimedia device.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

The development of standards such as DVD has given authors of data streams the capability of adding navigation options for the user. With this added capability, the authors of DVD titles are able to be "programmers" of interactive experiences for the consumer. Instead of programming lines of code, the authors are able to take audio and video clips and form them into nearly any structure that can be imagined. User control no longer has to be limited to stop, play, fast-forward, and rewind, as it is with a single linear entertainment program. The author can provide whatever options they choose to the user, including anything from a choice of camera angle to a choice of which path to take in a video scene. The added capability is provided by a "navigation layer" which has been added to the data stream syntax in the form of an interleaved substream. The navigation substream includes "navigation commands" which modify parameter registers in the DVD player and may be used to specify user options (typically listed in a menu format). Navigation commands are represented by binary values in 8-byte fields within various different syntax structures in the substream. Over 1600 commands and combinations of commands are provided for in the DVD standard, and the various combinations and placements of the commands presents a staggeringly large "verification space". In one embodiment, the disclosed system for verifying data stream processing systems provides a new type of profile which allows specification of the navigation commands within a data stream and generation of a data stream having those navigation commands. Further, this profile type provides a means for easy (and even automated) modification of data streams and allows straightforward coverage checking.

Turning now to the figures, FIG. 1 shows a block diagram of a system 100 for testing a multimedia device 102. The system comprises a workstation 104 having a monitor 106 and input device 108. Workstation 104 is coupled to multimedia device 102 via a signal source multiplexer 110, as are other signal sources such as ATAPI drive 112. The output of multimedia device 102 is coupled to display 114 and speakers 116A–F. System 100 allows a user to provide a wide variety of source bitstreams to multimedia device 102 for functionality verification. More importantly, as will be discussed further below, workstation 104 is configured to efficiently generate bitstreams for functional verification.

In the embodiment shown, multimedia device 102 includes a decoder 120, a memory controller 122, a memory 124, a DVD decoder 126, D/A converter 128, CPU 130, input sensor 132, and input control 134. Decoder 120 receives the source bitstream and applies channel decoding and error correction to the bitstream. The channel-decoded bitstream is buffered in memory 124 by memory controller 122. CPU 130 parses the channel decoded bitstream and extracts audio, video, and sub-picture bitstreams, and forwards these bitstreams to corresponding buffers in memory 124 via memory controller 122. DVD decoder 126 accesses the compressed audio and video substreams from memory 124 and decompresses them under control of CPU 130. The resulting digital audio and video signals are provided to D/A converter block 128 where they are converted to analog output audio and video signals. Display 114 converts the video signal into visual form and speakers 116A–116F convert their respective audio signals into audible form. CPU 130 controls the various other components of multimedia device 102 and detects user input from control 134 via input sensor 132. CPU 130 also decodes the navigation substream and implements the functions specified therein. A user, by means of control 134, may provide input selection and execution of both fixed and programmable operations.

Figure 2:
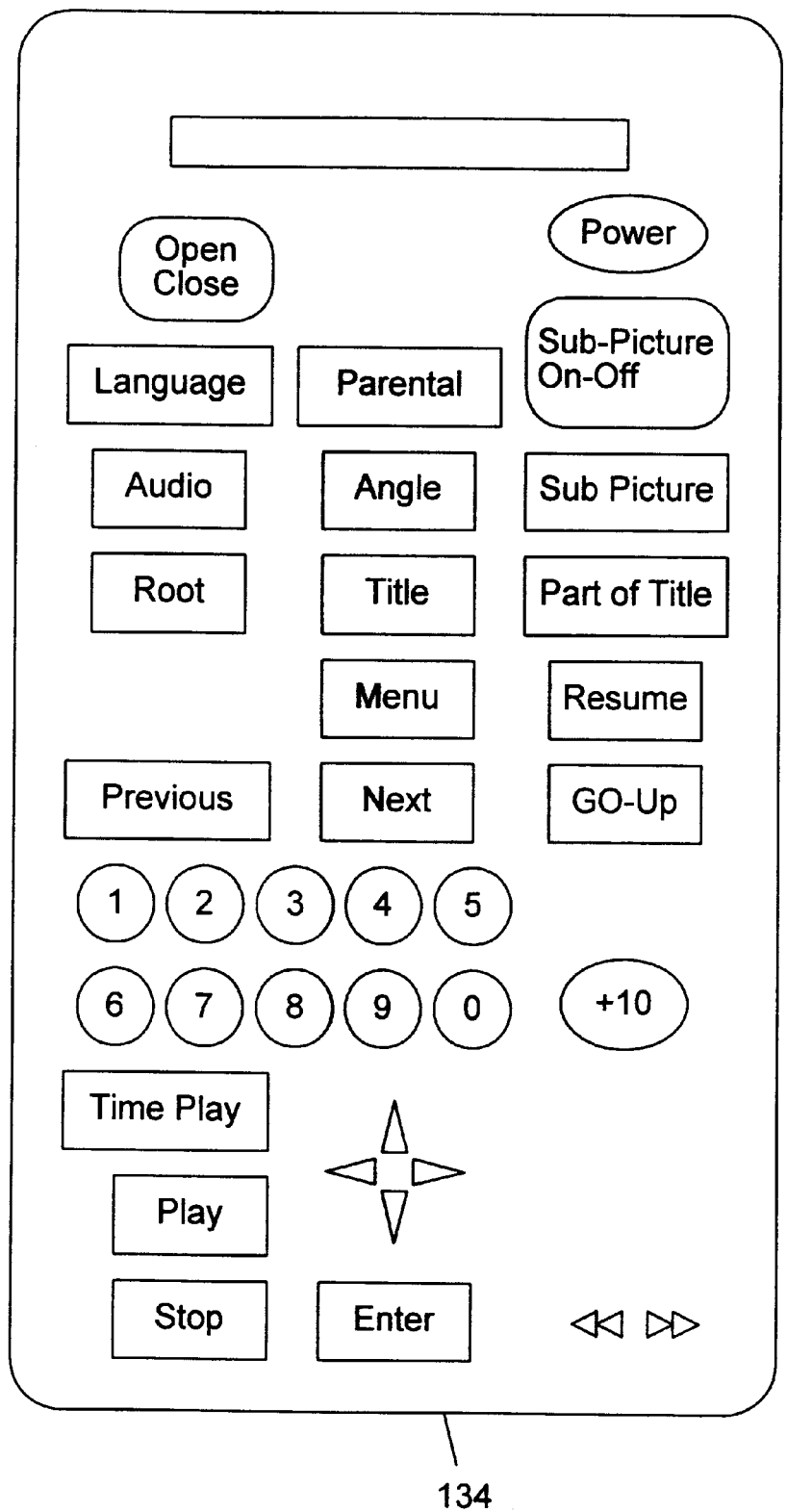
FIG. 2 shows an example of a user input control for the multimedia device.

An exemplary user control set 134 is shown in FIG. 2. Some of the controls perform fixed operations, i.e. the response of the multimedia device 102 is fully predetermined, while other controls invoke programmable options, e.g. cause a menu of programmable options to appear. A brief discussion of each of the controls shown follows.

A "Power" button toggles the device between active and inactive mode. This fixed operation reduces the power consumption of the device when the device is not in use. An "Open/Close" button toggles the position of the tray which holds the DVD disc. This fixed operation allows the exchange of DVD discs so other programs may be viewed. The "Play", "Stop", fast-forward and rewind buttons provide user control over the initiation, termination, and scanning of the entertainment playback. The "Time Play" button allows a user to specify desired portions for exclusive playback. These functions are also fixed functions.

Closing the tray with a disc in it or powering up the device with a disc in the tray causes the device to perform a preliminary scan of the disc to determine the operating parameters of the DVD disc. Some of the programmable functions may be programmed at this time from data on the disc. Often these programmable functions will provide a series of options to the user. The control 134 provides a group of number buttons "0"–"9" and "+10" for entering option numbers or parameter values. A group of four arrow buttons is also provided for moving between options and increasing or decreasing parameter values. An "Enter" button indicates the user's completion of an entry.

The "Language", "Parental Level", "Audio", "Angle", and "Sub-Picture" buttons all represent functions with programmable options. When one of these buttons is pressed, the various options will be presented in text on the screen. Pressing the "Language" button shows which languages may optionally be used, and one of the language options may then be selected. Similarly, pressing the "Parental Level" shows the various editing levels at which the entertainment may be provided, and a level may then be selected. More than one audio track may accompany the entertainment, and the "Audio" button allows the user to choose which one to use. More than one camera angle may be provided, and the "Angle" button provides for user selection of one. Sub-picture streams are run-length encoded bitmaps which are overlaid on the decoded image, and the user can select one using the "Sub-Picture" button. Various uses of subpicture streams include karaoke lyrics, subtitles, closed-captioning, menus, etc.. The "SubPicture ON/OFF" button toggles the visibility of the selected subpicture stream While providing programmable options to these functions allows for substantial customization of the entertainment program, the true interactivity is provided by the programmable menu functions.

The entertainment program may be organized in a hierarchical tree format and may provide a menu representing that format. The "Root", "Title" and "Part of Title" buttons provide one-touch shortcuts to the corresponding levels of the menu. The "Menu" button presents the most-recently used portion of the menu. If the "Menu" button was pressed during playback of the entertainment, pressing the "Resume" button causes the playback to continue where it was interrupted. The "Previous", "Next" and "Go-Up" buttons provide for navigation through the menu. It is noted that the functions and options presented to the user may change as the entertainment program progresses.

Figure 3:
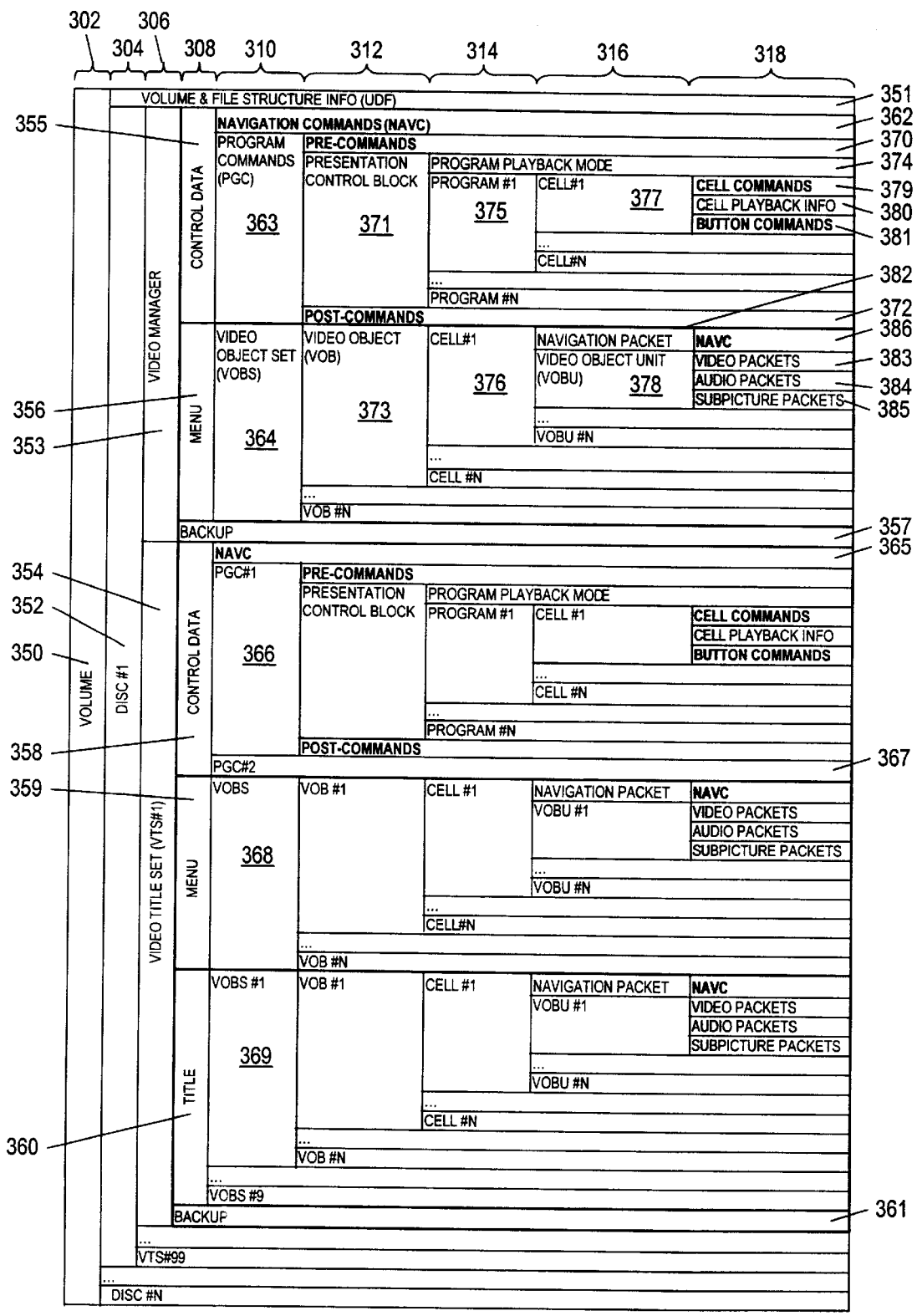
FIG. 3 is a table showing a simplified syntax structure.

FIG. 3 shows a simplified representation of the DVD) syntax structure. At its highest level 302, the DVD syntax specifies a volume 350. The next level 304 shows that the volume consists of a UDF header 351 and 1 to N discs 352. The UDF header 351 specifies the structure and organization of the volume 350, i.e. the sizes and beginning addresses of the individual discs 352.

At level 306, each disc 352 is shown to be comprised of a video manager 353 and from 1 to 99 video title sets 354. The video manager 353 provides a root menu which branches to all the video title sets 354 on the disc. The video title sets may be separate movies, video clips, entertainment programs, etc.

Level 308 shows that the video manager 353 comprises control data 355, menu data 356, and backup 357, and that the video title set 354 comprises control data 358, menu data 359, title data 360, and backup 361. Control data 355 is used to initially program the options upon power-up or insertion of a new disc. These options may then be updated or re-programmed by control data 358 when a video title set begins playing. Menu data 356 provides a root menu listing the video title sets 354. Menu data 359 provides video sub-menu listing different versions of the title 360. Title data 360 provides the entertainment package "payload", i.e. the audio and video clips the user wishes to hear and see. Backups 357 and 361 are used to program the options of the programmable controls in the event that the control data fields 355 and 358, respectively, are corrupted or otherwise unsuitable for the multimedia system 102 (e.g. if the system 102 only allows a restrictively small number of menu options).

Level 310 shows that control data 355 comprises a group of navigation commands 362 and a set of program commands 363, and that control data 358 similarly comprises a group of navigation commands 365 and a set of program commands 366, and a separate set of program commands 367. The menus 356 and 359 are shown to comprise video object sets 364 and 368, respectively, and title 360 comprises 1 to 9 video object sets 369.

Navigation command fields 362 and 365 are part of the control data fields 355 and 358, respectively, and they are part of the option programming that occurs, as are program command fields 363, 366, and 367. Video object sets 364, 368, and 369 contain audiovisual data for presentation to the user.

Level 312 shows that the program command fields comprise a group of pre-commands 370, a presentation control block 371, and a group of post-commands 372. At level 314, the presentation control block 371 is shown to hold a program playback mode field 374 and a series of programs 375. Each program 375 comprises a sequence of cells 377, as shown at level 316, and each cell holds a group of cell commands 379, a cell playback information block 380, and a group of button commands 381, as shown at level 318. The button command fields 381, cell command fields 379, post-command field 372, pre-command field 370, and navigation command fields 362 each include navigation commands.

Level 312 also shows that the video object sets each comprise a set of video objects 373. At level 314, each video object 373 is shown to hold a sequence of cells 376. Cells represent a single playback unit. The cells 376 comprise a navigation packet 382 and a series of video object units 378, as shown at level 316, and each video object unit 378 holds a plurality of interleaved video packets 383, audio packets 384, and subpicture packets 385, as shown at level 318. The navigation packets 382 include a group of navigation commands 386.

It is noted that the gray-shaded areas in FIG. 3 each include a plurality of navigation commands. These navigation commands act as instructions to set system parameters, calculate general parameters, make branching decisions, and initiate playback of various program chains. Typically they are used by the author of the disk to present options to the user in the form of menu pages which may be program-chained to other menu pages or bitstreams on the disc. The options often are "Where do you want to go"- or "What do you want to do" -type selection lists of audio-video clips. A large number of available navigation commands, in combination with a large selection of fields in which these navigation commands may be placed, makes verification of multimedia system 102 difficult. The verification is further complicated by the multiplicity of non-unique orderings of fields and commands within those fields by which a set of navigation tasks may be accomplished.

Referring back to FIG. 1, workstation 104 provides a bitstream having a syntax structure similar to that of FIG. 3 to multimedia device 102. There, the bitstream is parsed, and the video packets 383, audio packets 384, and subpicture packets 385 are routed to respective buffers for processing by DVD decoder 126. These packets carry the main payload, and represent the bulk of the bitstream. The rest of the bitstream is interpreted and acted on by software executing in CPU 130.

Figure 4:
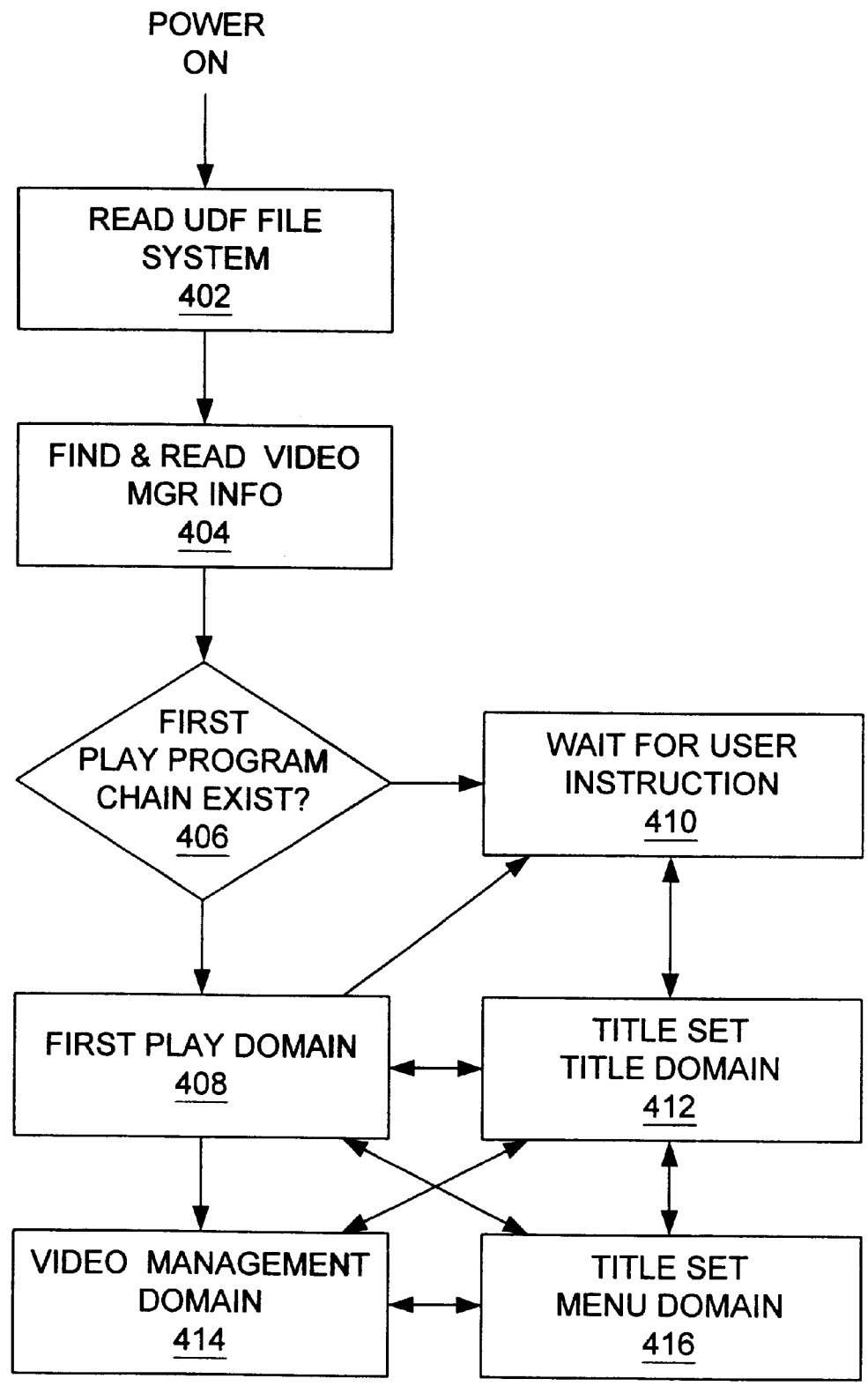
FIG. 4 is a high level flowchart of software executing in the multimedia device.

FIG. 4 shows a high-level flowchart of the software executing in CPU 130. Immediately after power-on, the software starts with block 402 where it reads the disc directory and determines the file structure on the disc. Then in block 404 the software retrieves the video manager information from the disc. In block 406, the software determines if a first-play program chain exists (i.e. an automatically executed program), and if so, transfers control to the first play program in block 408. Otherwise, the software enters block 410 and waits for user instruction. The software then moves between blocks 408, 410, 412, 414, and 416 depending on user operations and navigation commands provided on the disc. Block 408 represents programs in the auto-play sequence. Block 412 represents the program chains which provide the entertainment content of the disc. Block 414 represents menus for selecting between entertainment programs, and block 416 represents menus for selecting between sequences within an entertainment program.

Verification of multimedia system 102 comprises two parts: verification of the is hardware (particularly DVD decoder 126) and verification of the software. The bitstreams for verifying hardware tend to be markedly different from the bitstreams for verifying software. Verification of the hardware portion of the multimedia device typically uses bitstreams having 10–30 header bytes and 14 kilobytes of presentation data. This proportion of syntax-to-data lends itself readily to profile representation as described in the parent application. On the other hand, verification of the software portion typically uses bitstreams having 3000–6000 bytes of "header" (i.e. non-presentation data) and little or no "payload" (i.e. presentation data such as audio packets, video packets, and subpicture packets). To allow for intelligible profiles which are not overwhelming, a set of instruction mnemonics and instruction parameters is created for navigation commands, and a "bitstream de-compiler" and a "profile compiler" are written to convert these bitstreams to and from profiles.

Figure 5:
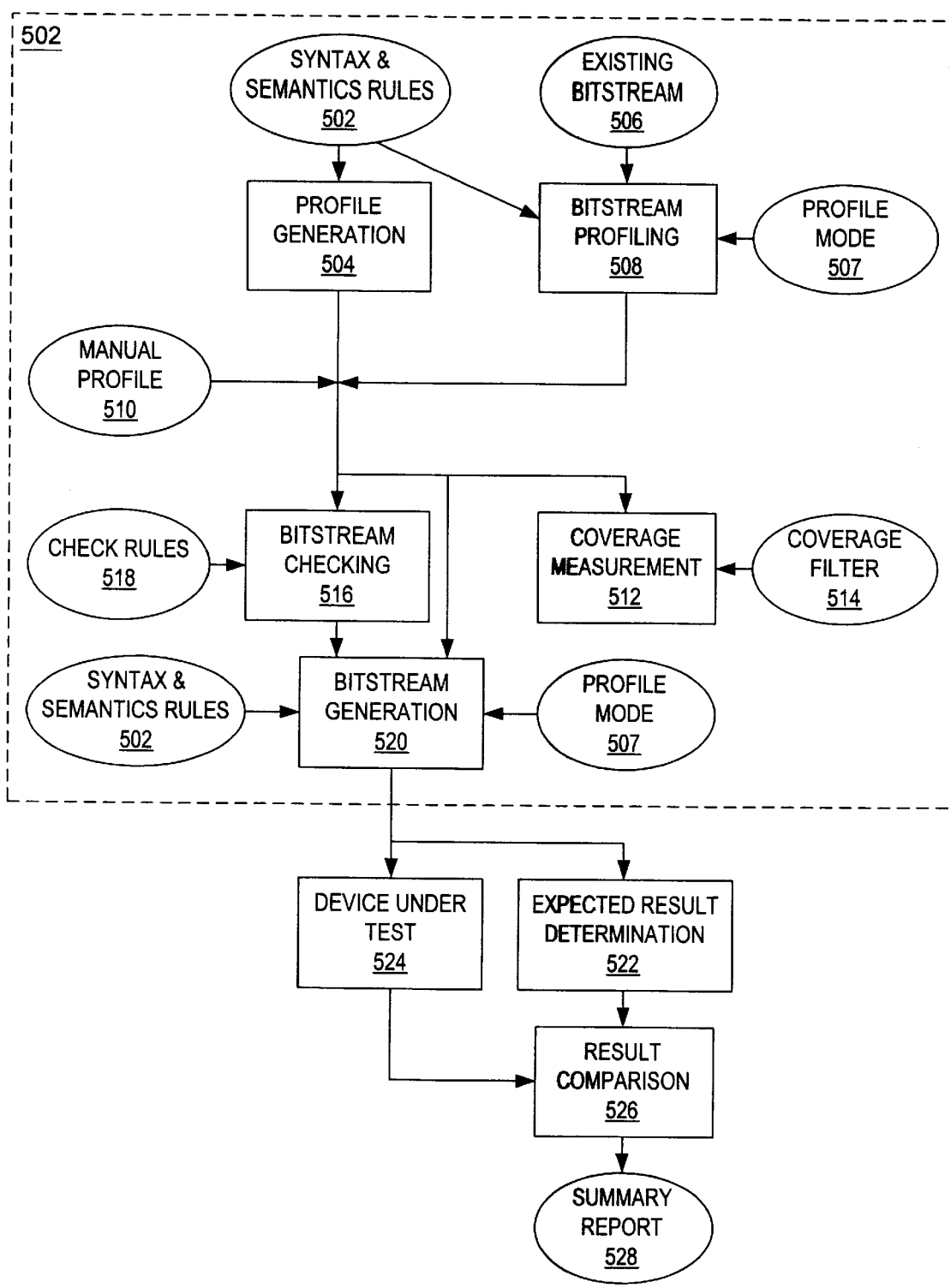
FIG. 5 is a block diagram of a method for using profiles to generate bitstreams.

FIG. 5 shows a block diagram of a method 500 for managing bitstreams using bitstream profiles. The method 500 comprises a profile generation step 504, a coverage measurement step 512, a bitstream checking step 516, and a bitstream generation step 520. The method 500 may also comprise a bitstream profiling step 508. Also shown are a device under test 524, an expected result determination step 522, a result comparison step 526, a summary report output 528, and various inputs which may include syntax & semantics rules 502, existing bitstreams 506, profile mode selections 507, manually generated profiles 510, and check rules 518.

The bitstream management method 500 processes some of the inputs to yield a set of profiles. The profiles are intelligible, compact representations of data streams. Given a selected profile mode 507, each data stream has a unique profile. However, the mapping of data streams to profiles may be many-to-one. As the profiles might represent only the fields of interest in a data stream, and many different data streams could have the same contents for the fields of interest, it is possible for many different data streams to have the same profile.

A profile may be obtained by filtering the data stream (i.e. retaining only those portions of interest), compacting the data stream, or some combination of filtering and compacting the data stream, and then de-compiling the data stream (i.e. converting the field values to human-intelligible form). A reason for doing this is that data streams, which are typically very large and unintelligible, may be more easily manipulated by manipulating their profiles. The use of profiles provides a unified system structure that advantageously enables the testing of different syntax rule sets within a system, as will be discussed further below.

Profiles may be generated manually and provided as an input, as illustrated by manual profile 510, they may be generated by processing an existing bitstream 506, or they may be generated in the profile generation step 504. In the bitstream profiling step 508, the existing bitstream 506 is parsed according to the syntax & semantics rules 502 to determine the values for each of the syntax variables defined by the existing bitstream 506. These values are then translated into a profile which is provided as output from bitstream profiling step 508. The form which the profile takes is determined by profile mode selection 507. Profile mode selection mode 507 may specify a compression algorithm to be used, a filtering operation to be applied, or some combination of these, and also a de-compiling method. De-compiling, as used herein, comprises translating syntax fields and their contents into mnemonic labels and associated parameter values or parameter types. De-compiling is discussed further below.

Profile generation step 504 uses a knowledge of the syntax & semantics rules 502 to generate valid (or if desired, certain invalid) permutations of values which may occur in a bitstream governed by that syntax rule set. The permutation of values is then translated into a profile of a bitstream. The profile of a bitstream will be highly dependent on the bitstream, but typically it is unnecessary to quote within the profile the exact values that will be used. Rather, an indication of the meaning of the values is preferably used, and this indication is preferably human-readable. For example, a sequence of audio samples might be represented by a character string such as "3 kHz SINE" or "DOORBELL". Alternatively, the profile may be provided in the form of a filtered and/or compressed data stream. In any case, the profile consists of a list of values which is sufficient to specify the exact contents of the fields of interest in the bitstream.

The set of profiles made available by profile generation step 504, bitstream profiling step 508 and/or manual profile input 510 may be processed in three different ways. First, the set of profiles may be examined in coverage measurement step 512 using parameters provided in the form of a coverage filter 514 to determine the coverage of a particular aspect of the syntax structure or device design. The coverage determination algorithm is typically dependent on the aspect for which coverage is being determined. For example, to determine the coverage of a single field, the coverage measurement step compares the number of values used in the field with the number of valid values for that field. An example of a coverage measurement is the percentage of a number of popular syntax constructions represented by one or more profiles in the set.

Second, the set of profiles may be checked in bitstream checking step 516 according to a set of check rules 518. The set of profiles is processed to select profiles which conform to the set of rules 518. The selected profiles may then be forwarded for further use, e.g. in FIG. 5 the selected profiles are provided to bitstream generation step 520.

Third, the set of profiles may be converted into bitstreams by bitstream generation step 520. In bitstream generation step 520 one profile is accepted at a time and converted into a bitstream represented by the profile according to the syntax & semantics rules 502, and using knowledge of the profile mode 507. In one application of the bitstream management method, the bitstreams provided by bitstream generation step 520 are applied to the device under test 524 and a means for determining the expected results 522. The outputs of the device under test 524 and the expected result determination step 522 are compared in result comparison step 526, which then generates a summary report 528.

It is noted that the set of profiles made available by profile generation step 504, bitstream profiling step 508 and/or manual profile input 510 will typically be stored for later use and re-use, as opposed to being regenerated each time a set of bitstreams is to be generated, checked, or examined to determine coverage.

Profiles for hardware verification of the multimedia device may tend to comprise lists of header syntax fields with corresponding parameter values and a concise indicator of a compressed data payload stored elsewhere. Profiles for software verification of the multimedia device are somewhat more demanding. The complexity of the DVD syntax and its versatility with respect to navigation commands beg for a much more powerful profile type which may be likened to source code for a program. Source code is widely recognized to be a machine-translatable and human-intelligible description of operations to be performed by a computer. In the current instance, a profile will be a machine-translatable and human-intelligible description of a data stream.

As the navigation commands within the bitstream provide programs for the programmable CPU to execute, one challenge is to generate bitstreams having these programs so as to verify the operation of the multimedia device. To do this, an instruction set representing each of the navigation commands is first generated. Next, programs are written using this instruction set. The programs are then compiled using a compiler to create a binary output, which is then folded into an existing bitstream. In this way, bitstreams for verifying software are easily created.

To provide better management of existing bitstreams, a bitstream de-compiler may be provided to extract navigation commands from an existing bitstream and convert them to instruction mnemonics. In this way an intelligible profile of the navigation commands in a bitstream is obtained. This profile can then be easily edited and then recompiled to produce a bitstreams which has been altered in accordance with the edits. The burden of sifting through enormous amounts of data to find and change only a few bytes is thereby alleviated.

The bitstream is not the only source of input to the multimedia device. The device user, by means of control 134, can provide input. This input may often introduce unpredictable effects on software executing on CPU 130, so a method for verifying the software in the presence of user input is desirable. To this end, a user profile may be created which specifies user actions (i.e. button pushes) at specific points in the bitstream. The user profile may consequently look like a list of time stamps followed by button labels. This user profile is typically associated with a particular bitstream and processed along with it to generate a series of user actions coordinated with the bitstream.

In the DVD standard, navigation commands each consist of a single instruction or a combination of two or three instructions. The instructions may be grouped into six types: Goto, Link, Jump, Compare, SetSystem, and Set. "Goto" instructions represent branches between navigation commands. "Link" instructions represent transfers of control within a Domain (a Domain is a set of program chains, and each disc may have up to four sets types: first play, video management, title, and menu domains). "Jump" instructions represent transfers of control between Domains. "Compare" instructions are for recognizing parameter values. "SetSystem" instructions represent instructions to set system parameters. "Set" instructions are used to calculate general parameter values.

FIG. 6 shows a table of illustrative navigation instruction parameters, along with their ranges and brief descriptions. This table is primarily for reference, and not much is to be gained by studying it separately from the operations which use these parameters. Accordingly, these parameters will be discussed in the context of the operations provided in FIG. 7.

FIGS. 7A–7C show a table of illustrative instruction mnemonics. This table is not intended to be complete or limiting, but rather it is provided for the purpose of describing an exemplary instruction set. In one embodiment, a complete set of mnemonics for DVD navigation commands includes 1663 mnemonics. The instruction mnemonics will be discussed in groups.

In the first group, instructions 1–3 require no parameters. Break is used to halt execution of a program. Exit is used to return from a subroutine. NOP represents No Operation, and has multiple uses for readability, debugging and reserving space for future operations.

In the second group are the mnemonics for "simple" instructions 4–28. CallSS is used to start presentation of the program chain specified by the Domain ID. Goto is used to jump to a navigation command (CommandNum) within the current navigation command area.

Instruction mnemonics 6–10 represent jump instructions used to transfer control to program chains outside the current domain. The jump instruction mnemonics vary according to source and destination. Instruction mnemonics 11–15 represent link instructions used to transfer control to program chains within the current domain. Link instruction mnemonic 11 is used to link menus together.

There are 24 system parameters (registers) which may be controlled/changed via navigation commands:

0-Menu Description Language code
1-Audio Stream number
2-Sub-Picture Stream number
3-Angle number
4-Title number
5-VTS Title number
6-Title PGC number
7-Part Of Title number for current sequential POC
8-Highlighted Button number
9-Navigation Timer
10-Title PGC number for Timer
11-Audio Mixing mode (for Karaoke)
12-Country code (for Parental Management)
13-Parental Management level
14-Player Configuration (for Video)
15-Player Configuration (for Audio)
16-Initial Language code (for Audio)
17-Initial Language code (for Sub-picture)
18-Initial Language code (extension for Sub-picture)
19-Initial Language code (for Sub-picture)
20–23-Reserved Additionally, there are 16 parameters(registers) for general use (e.g. arithmetic scratch pads, counters) which could be used in interactive titles such as quizzes and games. Instruction mnemonics 16–17 represent set instructions used to calculate values for general purpose parameters, and instruction mnemonics 18–28 represent set-system-parameter instructions used to set the value of various system parameters.

Instruction mnemonics 29–63 represent compare instructions which provide for conditional instruction execution. Instruction mnemonics 64–127 represent compound instructions which consist of more than one simple or conditional instruction. The second instruction is typically a link instruction which transfers control after the first instruction is executed.

These instruction mnemonics may be used to write a bitstream profile, as shown by the example in FIG. 8. The profile begins with an INCLUDE command which tells the computer to include text from another file when converting the profile into a bitstream. The other file could include information regarding bitstream defaults and where the fields specified by the profile are located in the bitstream. The ASSEMBLE keyword signals to the computer where the profile compiler should begin, and the later END keyword signals where the profile compiler should stop. The FILE command specifies the destination of the resultant bitstream.

The instruction mnemonics between the ASSEMBLE and END keywords specify a series of navigation commands to be included in the bitstream, in the pre-command area of the video manager control data block (this location would be specified in the include file). The first instruction compares general parameter 6 with zero, and if general parameter 6 equals zero, control is transferred to the 16th command (SETI MOV GPRM_7 0). The second instruction sets general parameter 4 equal to 1. The third instruction determines if general parameter 5 is greater than or equal to general parameter 4, and if so, control is transferred to video title number 3. The fourth instruction determines if general parameter 0 equals general parameter 4, and if so, control is transferred to video title number 2. The fifth instruction sets general parameter 4 equal to 2. The sixth instruction determines if general parameter 0 equals general parameter 4, and if so, control is transferred to video title number 17. The seventh instruction sets general parameter 4 equal to 3. The eighth instruction determines if general parameter 0 equals general parameter 4, and if so, transfers control to video title 18. The ninth instruction sets general parameter 4 equal to 1. The tenth instruction determines if general parameter 3 equals general parameter 4, and if so, transfers control to video title 17. The eleventh instruction sets general parameter 4 equal to 2. The twelfth instruction determines if general parameter 3 equals general parameter 4, and if so, transfers control to video title 2. The thirteenth instruction sets general parameter 4 equal to 3. The fourteenth instruction determines if general parameter 9 equals general parameter 4, and if so, invokes the exit command. The fifteenth instruction determines if general parameter 3 is greater than or equal to general parameter 4, and if so, transfers control to the root menu of video title 1 in video title set 5. The sixteenth through twenty-fifth instructions set general parameters 0–8 equal to zero and general parameter 9 equal to 3.

In conclusion, a multimedia device verification system has been described. A computer is provided with a multimedia bitstream generator which generates multimedia bitstreams with characteristics specified by bitstream profiles. The bitstream profiles may include a list of instruction mnemonics with associated parameters. The list is a human-intelligible specification of navigation commands which are to be provided to the multimedia device as part of the multimedia bitstream. The computer executes a profile compiler to convert the instruction mnemonics into navigation commands in binary form. The bitstream generator incorporates the navigation commands into the generated multimedia bitstream, thereby automating much of the verification effort.

The described system may advantageously provide for increased productivity, improved accuracy, and better documentation in verification efforts due to the use of human-intelligible bitstream profiles. Further, the system advantageously provides the capability to profile existing bitstreams and craft new bitstreams, and the capability to apply user actions at specific times or in specific sequences relative to the multimedia bitstream. Still further, the system advantageously allows for simplified editing of existing bitstreams via editing of bitstream profiles, and a coverage tool may automatically generate bitstream profiles for modifying existing bitstreams to provide complete verification coverage. The intelligibility of the bitstream profile advantageously provides for efficient syntax checking of existing bitstreams, and the instruction mnemonic profile provides a powerful tool for crafting optimum bitstreams for various verification criteria such as effectiveness, size, testing range, coverage, and functional modules. The described system may also be provided with a modular hierarchy, so that the profile compiler may be used separately from the bitstream generator if it is desired to provide module-specific verification.

Numerous variations and modifications will become apparent to those skilled in the art once the above disclosure is fully appreciated. It is intended that the following claims be interpreted to embrace all such variations and modifications.

What is claimed is:

1. A method for testing a multimedia device, wherein the method comprises:
   authoring a bitstream profile;
   authoring a user-action profile, wherein the user-action profile comprises a list of button operations each having a corresponding time stamp;
   converting the bitstream profile into a bitstream;
   converting the user-action profile into a series of user actions occurring at specified points in the bitstream wherein said series of user actions simulates user interaction with the multimedia system;
   applying the bitstream to the multimedia system; and
   applying the series of user actions to the multimedia system while the bitstream is being applied.

2. A method for testing a multimedia device, wherein the method comprises:
   processing an existing bitstream to determine a bitstream profile indicative of a set of bitstream field values in the existing bitstream, wherein the bitstream profile includes a list of instruction mnemonics representative of the set of bitstream field values;
   editing the bitstream profile to change one or more bitstream field values;
   converting the bitstream profile into a new set of bitstream field values;
   combining the new set of bitstream field values with the existing bitstream to generate a new bitstream;
   applying the new bitstream to the multimedia system; and
   verifying functionality of the multimedia device.

3. The method of claim 2, wherein the set of bitstream field values comprises navigation commands to the multimedia device, and wherein the bitstream profile comprises a list of instruction mnemonics.

4. The method of claim 3, wherein the editing is performed by a test generator to test a navigation subsystem in the multimedia device.

5. A system for testing a multimedia device, wherein the system comprises:
   a device under test configured to receive a multimedia bitstream and configured to operate on the multimedia bitstream to produce audio and video signals;
   a computer coupled to the device under test to provide the multimedia bitstream, wherein the computer generates the multimedia bitstream in response to a bitstream profile, wherein the profile includes a list of instruction mnemonics, and wherein the list specifies field values in the multimedia bitstream;
   wherein the computer is configured to execute a compiler which converts the list of instruction mnemonics into bitstream field values.

6. The system of claim 5, wherein the instruction mnemonics have associated parameters which further specify field values in the multimedia bitstream.

7. The system of claim 5, wherein the computer is further configured to execute a bitstream generator which generates the multimedia bitstream having the specified bitstream field values.

8. The system of claim 5, wherein the multimedia bitstream includes a navigation substream, wherein the device under test includes a CPU configured to execute software, wherein the software processes the navigation substream to operate on field values, and wherein the field values are specified using instruction mnemonics in the bitstream profile.

9. The system of claim 5, wherein the bitstream profile has an associated user action profile, wherein the computer is further configured to convert the user action profile into a series of user actions, wherein the computer is configured to apply the user actions to the device under test while the multimedia bitstream is being provided.

10. The system of claim 9, wherein the user action profile comprises a list of button pushes.

11. The system of claim 10, wherein the button pushes are provided with corresponding time stamps.

12. The system of claim 5, wherein the computer is further configured to process an existing bitstream to determine a first bitstream profile indicative of field values in the bitstream.

13. The system of claim 12, wherein the first bitstream profile is edited to produce a second bitstream profile.

14. The system of claim 13, wherein the computer converts the second bitstream profile into a set of bitstream field values, and wherein the computer combines the set of bitstream field values with the existing bitstream to generate the multimedia bitstream.

15. A system for testing a multimedia device, wherein the system comprises:

a device under test configured to receive a multimedia bitstream and configured to operate on the multimedia bitstream to produce audio and video signals;

a computer coupled to the device under test to provide the multimedia bitstream, wherein the computer executes a bitstream generator to generate the multimedia bitstream, wherein the bitstream generator is configured to receive a bitstream profile, wherein the bitstream generator is configured to convert the bitstream profile into syntax field values in the bitstream, wherein the bitstream profile includes a list of instruction mnemonics specifying navigation commands to be included in the bitstream, wherein the bitstream generator includes a compiler configured to convert the instruction mnemonics into navigation commands, wherein the bitstream generator is configured to receive encoded multimedia blocks, wherein the generator is configured to combine the syntax field values, the navigation commands and the encoded multimedia blocks to form the multimedia bitstream.

16. The system of claim 15, wherein the computer retrieves the encoded multimedia blocks from a multimedia data storage device.

17. The system of claim 15, wherein the computer generates the encoded multimedia blocks.

* * * * *